United States Patent Office 3,144,601
Patented Aug. 11, 1964

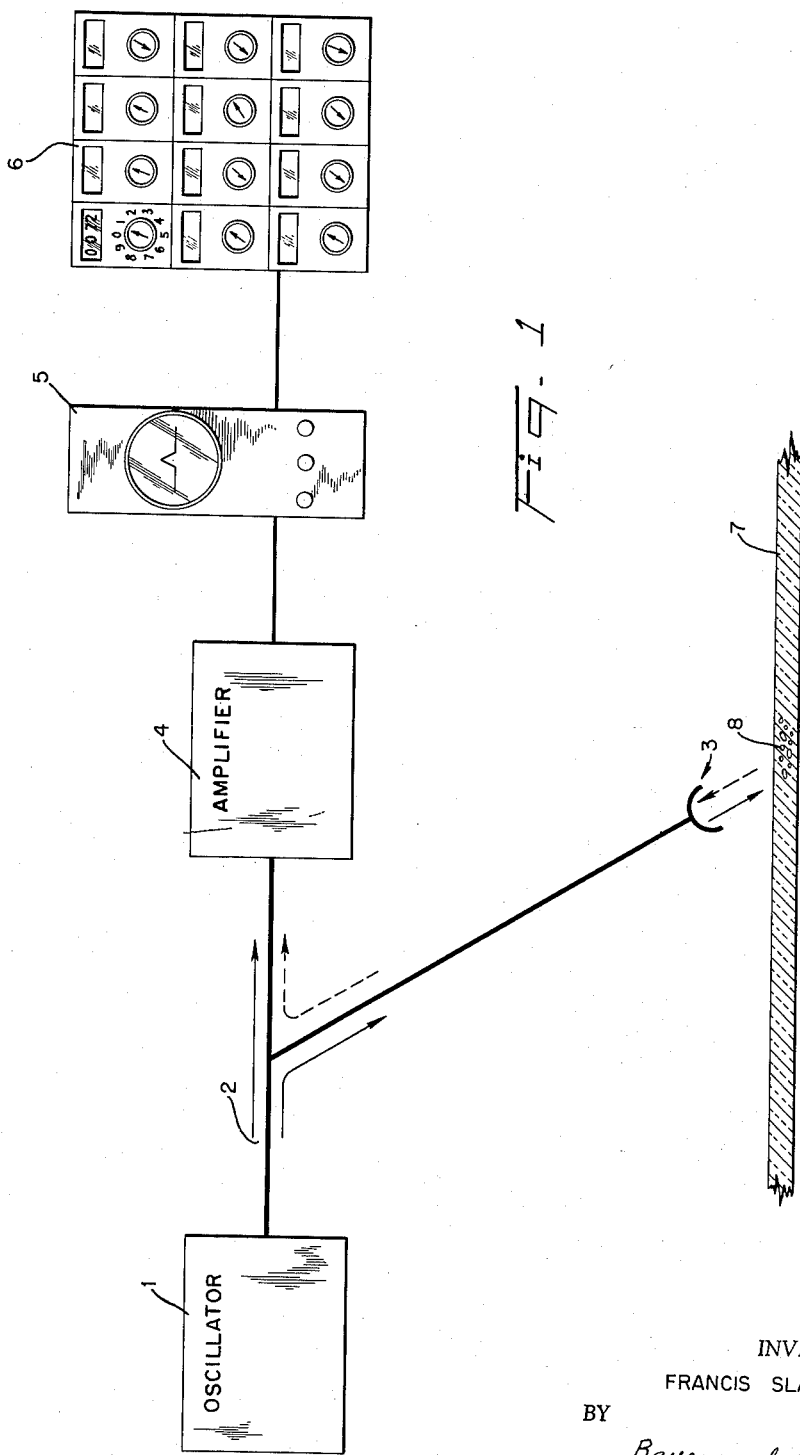

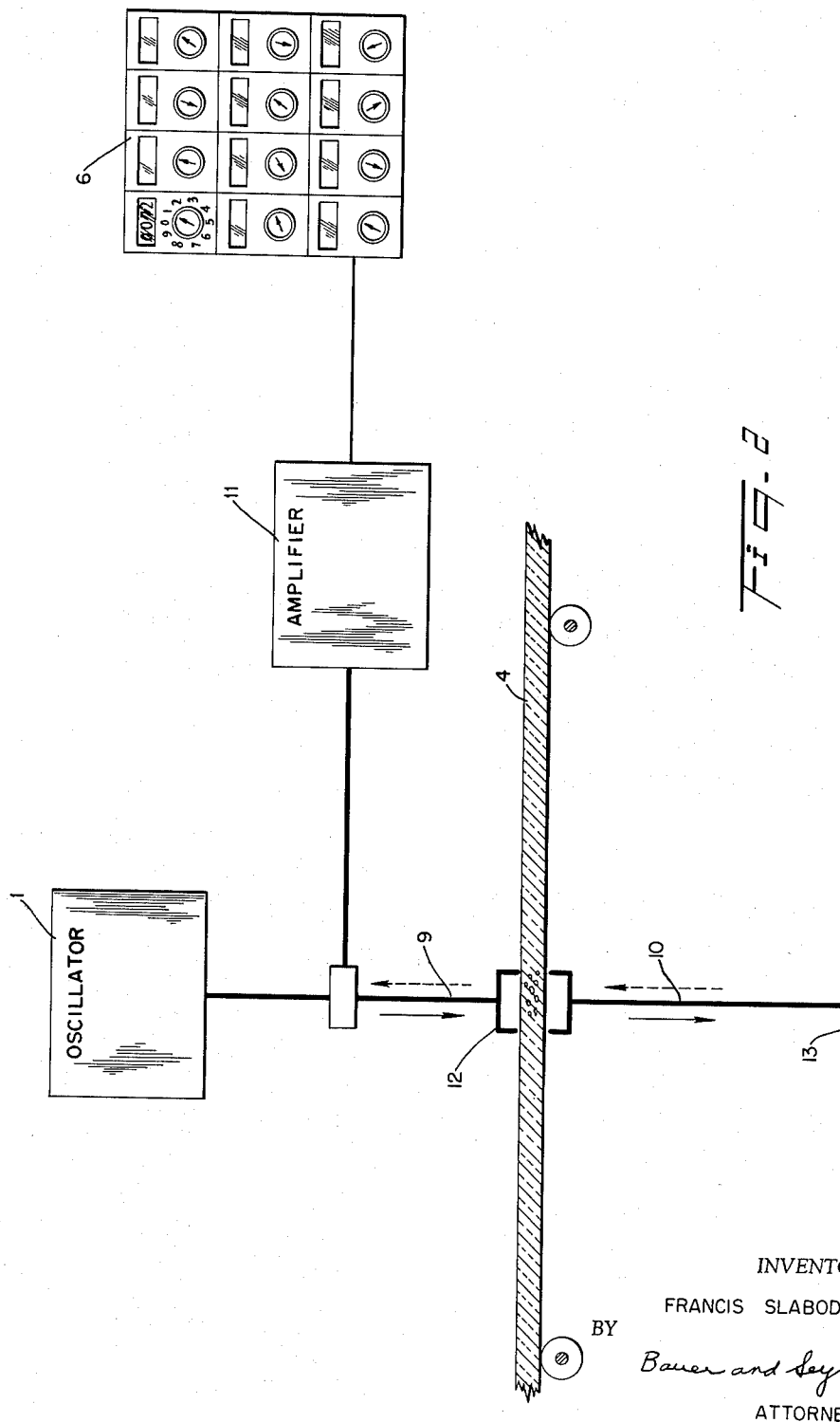

3,144,601
METHOD OF DISCOVERING AND LOCATING THE POSITION OF LOCALIZED ELECTRICALLY NON-CONDUCTING DEFECTS IN NON-CONDUCTING MATERIALS
Francis Slabodsky, Paris, France, assignor to Compagnie de Saint-Gobain, Paris, France
Filed Jan. 14, 1958, Ser. No. 708,929
Claims priority, application France Jan. 16, 1957
5 Claims. (Cl. 324—58.5)

This invention relates to a method of and an apparatus for detecting non-homogeneous zones in material. More particularly, the invention relates to the detecting of irregularities and defects in the interior of, or on the surface of, electrically non-conducting material by reflected or transmitted high frequency electromagnetic waves of frequencies less than those of visible light.

The inventin has among its objects the provision of a novel method of detecting small irregularities or defects in electrically non-conducting material, either stationary or movable.

Another object of the invention is the provision of a novel apparatus for detecting small irregularities or defects in electrically non-conducting material.

Yet another object of the invention lies in the provision of a novel method of and apparatus for detecting small zones of non-homogeneity in an electrically non-conducting material by subjecting such material to a beam of high frequency electromagnetic waves of frequencies less than those of visible light.

The above and further objects and novel features of the invention will more fully appear from the following description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIGURE 1 is a view depicting somewhat diagrammatically an apparatus in accordance with the invention for locating nonhomogeneous zones in material by the use of electromagnetic waves reflected from such material.

FIGURE 2 is a diagrammatic view of another apparatus according to the invention for locating non-homogeneous zones in material by the use of electromagnetic waves transmitted through such material.

The method and apparatus of the invention will be discussed in its application to the examination of a sheet or plate of glass to detect non-homogeneous zones such as irregularities and defects, although it will be evident that the invention may be used to advantage in the examination of other electrically non-conductive materials.

Glass sheets and plates frequently contain small unwanted defects such as bubbles, stones, and unvitrified particles which, when of small dimensions such as from 1 to .1 mm. are difficult to detect and locate rapidly in a systematic manner by presently known methods and apparatus. In accordance with the invention such zones of non-homogeneity are detected and located by directing on the material being examined a beam of short wave electromagnetic waves, sometimes called "micro-waves," receiving the waves reflected from or transmitted by the material, and observing and/or measuring the received waves. Such observation of the received waves permits the operator to detect the presence of such non-homogeneous zones, to locate defects in the material, and to determine the dimension of such defects.

Turning now to FIGURE 1 of the drawing, there is shown therein an apparatus by means of which an extended plate-like object such as a plate of glass 7 may be analyzed by scanning it with a beam of millimetric or centimetric electromagnetic waves. A plurality of small bubbles 8 are shown within the glass plate. Such bubbles, whose presence and size and location are detected by the present invention, are shown exaggerated in size for ease of illustration.

The glass plate 7 is mounted on a support not shown, in particular rollers for travelling and is subjected to a beam of incident electromagnetic waves so that such beam of incident waves scans the plate in accordance with a predetermined path as for example, by periodically moving the wave transmitter and receiver 3 across the plate while the plate travels longitudinally at a constant speed. Such plate may be travelling, for example, incident to its fabrication. The beam of waves thus traverses each zone of the plate, and the readings at instruments 5 and 6 are uniquely correlated with each zone of the plate.

The apparatus employs a conventional source of high frequency electromagnetic waves. Such sources, generally shown at 1, may include a power unit, an oscillator, such as resonant cavities, or klystron, and miscellaneous circuits permitting the adjustment of the wave length of the generated and transmitted micro-waves.

The source 1 may include an amplifier, whereby the amplitude of the waves, and thus the amount of emitted power, is increased.

The thus generated and amplified waves of the desired frequency, shown in the drawing as heavy unbroken lines, are led through a suitable wave guide to a combined wave transmitter and receiver 3, which, as above explained, travels with a scanning motion with respect to the plate 7. Means 3 may be directly the waveguide end, cut parallel to the surface of the material being scanned, with or without a dielectric horn coming as close as possible to the surface of the aforesaid material. Such horn at the same time insures maximum radiating power by giving a minimum air gap and a suitable adaption between waveguide and material being scanned, and gives more security to the system in case of accidental contacts between waveguide and surface material. More involved antennas may include use of a slotted waveguide, or a combination of suitable electromagnetic horns. It is quite clear that the same apparatus (waveguide and section, for instance) may be used as a combined radiator-receiving antenna.

The wave guide leading to means 3 is coupled to the wave guides between wave source 1 and a detector and amplifier 4 by a known type of coupler 2, such as that known as the "Magic T" coupler. The waves which impinge upon nonhomogeneous zones or defects in plate 7, such as bubbles 8, are partly reflected, as indicated by the dash lines, to be received at means 3; the detection of such reflected waves allows the defects to be detected. The thus reflected waves may be detected by any known means for detecting electromagnetic micro-waves, for example by the appearance of echos in an oscilloscope 5 connected to detector and amplifier 4, by the mixing of incident and reflected waves following detection of a defect at a zone of plate 7, or by the creation of beats in a crystal detector between the incident and the reflected waves particularly when the material being examined is travelling. It is well known that mixing the transmitted wave with the wave received after reflection from the material tested in a suitable coupler such as a Magic T will produce frequency beats if the frequency of the received wave has been altered through reflection from the linearly moving material tested. Such beats may be detected by a crystal and displayed on an oscilloscope screen or, after suitable amplifying and decoding, the detected signal may be recorded on memory devices such as counters or magnetic tapes. The amplitude and form of the detected signal are indicative of the presence and location of defects in the material tested.

The apparatus may be modified as shown in FIGURE 2 so as to examine the plate 7 by a beam of electromagnetic microwaves transmitted therethrough. In such modified apparatus (FIG. 2) a waveguide 9 is disposed adjacent one surface of the material being examined and perpendicular thereto, and another waveguide 10 is disposed adjacent the other surface of the material directly opposite to the first waveguide. The defects appeared as losses in waveguide transmission due either to surface defects in the path of the currents flowing from the walls of the transmitting waveguide to the walls of the receiving waveguide, such currents flowing between "walls" of material being examined which may contain surface defects or to a discontinuity in the dielectric constant of the material being examined. These losses may be detected by measuring by a device 11, for instance, the voltage standing wave ratio in the guide, parts of which are the transmitting waveguide, sections of air or intermediate substance 12 (suitably cut and tapered dielectric substance, so as to insure maximum closeness to the material being examined, maximum transmission power and minimum reflection losses) and material being examined and the receiving waveguide conveniently terminated by a short circuit 13. Device 11 is a suitably mounted probe, for instance on a carriage free to move along a slot cut in the wave guide. The standing wave ratio can be directly measured by a crystal detector mounted as the probe receiver. Short circuit may be a simple transverse metal plate, fixed or assuming the form of a sliding piston inside the waveguide. As to the scanning of the entire surface of a travelling material being examined, it can be obtained by closely grouping an adequate number of such waveguides in a manner similar to organ-pipes.

As indicated, the method and apparatus may be employed with short, high frequency electromagnetic waves having wave lengths longer than light waves in the visible spectrum. Waves of the frequency which are useful in the invention are sometimes called "micro-waves." Typical of the waves employed in accordance with the invention are those having wave lengths lying in a range on the order of about 1 mm. to about 1 cm.

The method and apparatus according to the invention may be used in particular for detecting defects in a material in sheet form, for example glass, which is obtained in a continuous manufacturing process and is caused to travel in front of the dectecting apparatus to which a suitable motion can be given in accordance to that of the material in order to examine the entire sheet.

Although only a limited number of embodiments of the invention have been illustrated in the accompanying drawings and described in the foregoing specification, it is to be expressly understood that various changes, such as in the relative dimensions of the parts, materials used, and the like, as well as the suggested manner of use of the apparatus of the invention, may be made therein without departing from the spirit and scope of the invention as will now be apparent to those skilled in the art. In case of articles of great dimensions to be examined, the article or the apparatus used for detecting the defects, or both may be given any convenient relative movement.

If the specimen to be examined is of small extent, no continuous scanning of the specimen will be necessary, but one or at most several observations being necessary to cover the entire extent of the specimen.

What is claimed is:

1. A method of searching for and discovering the position and the dimension of localized electrically non-conducting defects in the surface and the interior of a sheet of electrically non-conducting material, said defects having dimensions on the order of the range 1 mm. to $\frac{1}{10}$ mm., comprising directing upon and scanning such sheet of material with a moving beam of electromagnetic waves, having a wave length on the order of the range from 1 millimeter to 1 centimeter, by displacing the beam of waves relative to the surface of the material, receiving the beam of waves reflected by the material, and recording the disturbances appearing in such received waves.

2. A method of discovering and determining the position of localized electrically non-conducting defects, having dimensions on the order of 0.1–1 mm., which may exist in the interior or on the surface of a sheet of electrically non-conducting material, said method comprising directing upon said sheet of material an incident beam of electromagnetic waves having a wavelength on the order of 0.1–1 cm., receiving the beam of waves reflected by the sheet of material, moving the incident beam of waves relative to the sheet of material, and observing changes in frequency in the thus received reflected beam of waves, such changes of frequency permitting the determination of the position and the dimension of the defects in the sheet of material which the waves have encountered.

3. A method of discovering and determining the position of localized heterogeneous defects, such as bubbles, stones, and unvitrified particles having dimensions on the order of 0.1–1 mm., which may exist in the interior of or on the surface of a sheet of glass, such method comprising continuously moving the sheet of glass during its fabrication, directing upon the sheet of glass as it thus moves an incident beam of electromagnetic waves having a wavelength in the vicinity of 1 cm., moving the incident beam of waves relative to the sheet of glass, receiving the beam of waves reflected by the sheet of material, and observing changes in frequency in the thus received reflected beam of waves, such changes of frequency permitting the determination of the position and the dimension of the defects in the sheet of glass which the waves have encountered.

4. A method of discovering and determining the position of localized electrically non-conducting defects, having dimensions on the order of 0.1–1 mm., which may exist in the interior or on the surface of a continuously traveling sheet of electrically non-conducting material, said method comprising directing upon the sheet of material being examined a beam of electromagnetic waves having a wavelength on the order of 0.1–1 cm., scanning the sheet by periodic movement of the beam across its surface, receiving the beam of waves after it has passed through at least a portion of the sheet of material and activating recording means by the received beam, thereby recording the defects in the sheet of material which the waves have encountered.

5. A method of discovering and determining the position of localized heterogeneous defects, such as bubbles, stones, and unvitrified particles having dimensions on the order of 0.1–1 mm., which may exist in the interior of or on the surface of a sheet of glass which is moving continuously, said method comprising regularly sweeping the surface of the sheet of glass as it thus moves with an incident beam of electromagnetic waves having a wavelength in the vicinity of 0.1–1 cm., receiving the beam of waves after it has passed through at least a portion of the sheet of glass and activating recording means by the received beam, thereby recording defects in the sheet of glass which the waves have encountered.

References Cited in the file of this patent

UNITED STATES PATENTS

| | | |
|---|---|---|
| 2,455,941 | Muskat et al. | Dec. 14, 1948 |
| 2,455,942 | Coggeshall et al. | Dec. 14, 1948 |
| 2,457,695 | Liskow | Dec. 28, 1948 |
| 2,463,297 | Muskat et al. | Mar. 1, 1949 |
| 2,596,530 | Clarke | May 13, 1952 |
| 2,659,860 | Breazeale | Nov. 17, 1953 |
| 2,797,388 | Maybury et al. | June 25, 1957 |
| 2,952,296 | Kofoid | Sept. 13, 1960 |

OTHER REFERENCES

Technique of Microwave Measurement, text edited by C. G. Montgomery, MIT Radiation Laboratory Series, McGraw-Hill Book Co., Inc., 1947, pp. 593 and 605.

Publication: Electrical Engineering, March 1954, Microwaves by Ryan and Summers, pp. 251–255.